Figure 1:
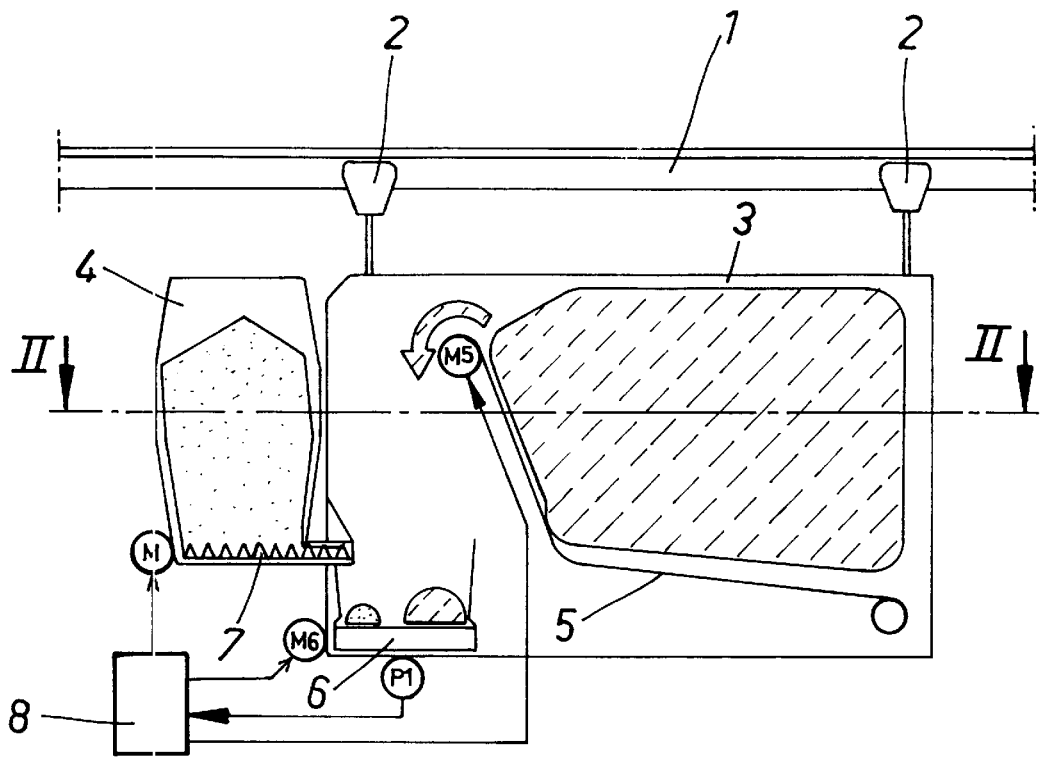

United States Patent [19]
Ojaniemi

[11] Patent Number: 6,067,932
[45] Date of Patent: May 30, 2000

[54] METHOD AND APPARATUS FOR DOSING THE COMPONENTS OF A MIXED FODDER FOR FEEDING CATTLE

[75] Inventor: Juha Ojaniemi, Kylänpää, Finland

[73] Assignee: Pellonpaja Oy, Finland

[21] Appl. No.: 09/082,759

[22] Filed: May 21, 1998

[30] Foreign Application Priority Data

Jun. 18, 1997 [FI] Finland ................................. 972596

[51] Int. Cl.[7] .................................................. A01K 5/00
[52] U.S. Cl. ................................. 119/51.02; 119/51.13; 119/53
[58] Field of Search ........................... 119/51.02, 51.01, 119/51.12, 51.13, 53, 56.1; 426/623, 635

[56] References Cited

U.S. PATENT DOCUMENTS

| | | | |
|---|---|---|---|
| 3,881,024 | 4/1975 | Pahoundis et al. | 426/578 |
| 3,982,027 | 9/1976 | Valeur et al. | 426/69 |
| 4,110,484 | 8/1978 | Rule et al. | 426/582 |
| 4,559,904 | 12/1985 | Harmsen | 119/51.02 |
| 4,631,192 | 12/1986 | Mommer et al. | 426/69 |
| 4,701,331 | 10/1987 | Grabitz | 426/302 |
| 4,732,775 | 3/1988 | Millauer | 426/635 |
| 5,069,165 | 12/1991 | Rousseau | 119/57.6 |
| 5,241,924 | 9/1993 | Lundin et al. | 119/51.02 |
| 5,436,015 | 7/1995 | Patterson et al. | 426/94 |
| 5,736,176 | 4/1998 | Gombos et al. | 426/54 |
| 5,778,820 | 7/1998 | Lely et al. | 119/14.18 |

*Primary Examiner*—Peter M. Poon
*Assistant Examiner*—Yvonne R. Abbott
*Attorney, Agent, or Firm*—Austin R. Miller

[57] ABSTRACT

The invention relates to a method and an apparatus for dosing the components of a mixed fodder for feeding cattle. The straw feed is delivered onto a horizontal conveyor (6) for weighing its amount thereon. The flour is metered by means of metering mechanisms (7, M1–M4) controlled by a calculator (8*a*), which dose amounts of flour proportioned as desired to the amount of straw feed directly within the straw feed concurrently with the weighing thereof. The weighing result of a weighed component is reduced in real time on the basis of dosages received from the calculator (8*a*).

8 Claims, 1 Drawing Sheet

METHOD AND APPARATUS FOR DOSING THE COMPONENTS OF A MIXED FODDER FOR FEEDING CATTLE

The present invention relates to a method for dosing the components of a mixed fodder for feeding cattle or livestock, said method comprising the dosing of precisely measured components onto a horizontal conveyor for supplying the livestock with the mixed fodder constituted by the components.

The invention relates also to an apparatus for dosing the components of a mixed fodder for feeding cattle, said apparatus comprising a coarse feed container, a plurality of concentrated fodder containers, a horizontal conveyor, means for supplying the coarse feed onto the horizontal conveyor, and means for supplying the concentrated fodders onto the horizontal conveyor, as well as a data processing unit for receiving the weighing data from a weighing sensor in the horizontal conveyor and for controlling the operation of said supply means.

Mixed fodder feeding, wherein concentrated fodders and coarse feed are mixed with each other, is rapidly gaining popularity. For example, on large cattle farms in the U.S.A., sizable mixer wagons are used for mixing a variety of feed compositions. The compositions are distributed from a mixer wagon directly to the animals. The animals are grouped in several separate feeding groups and each group is supplied with a feed composition required by a given production phase. These farms handle several hundred cows and, thus, it is possible to prepare large amounts of various mixtures. There are also many smaller farms in Europe and in the Nordic countries, whereby it is practical to blend large amounts of various mixtures.

The prior known mixer wagons are provided with conveyor scales for weighing each component separately, which requires a separate mixing of the components.

An object of the invention is to provide a method and an apparatus, capable of preparing an individual feed mixture for each individual animal.

Hence, the invention is based on the principle that a single component is weighed and the others are individually dosed under the control of a calculator in a mixed condition to the same destination and concurrently with the feed being weighed. Thus, the components blend with each other during the course of dosing, and a separate mixing is not necessarily needed. If desired, it is possible to employ an extra mixing, the need for which is nevertheless substantially reduced as compared to traditional mixed-feed metering mechanisms, in which a separate mixing step is necessary for separately supplied and separately weighed components.

The operation of a method and an apparatus of the invention is also more expeditious, since there is no need for a separate and hence successive weighing of successive components.

Figure 2:
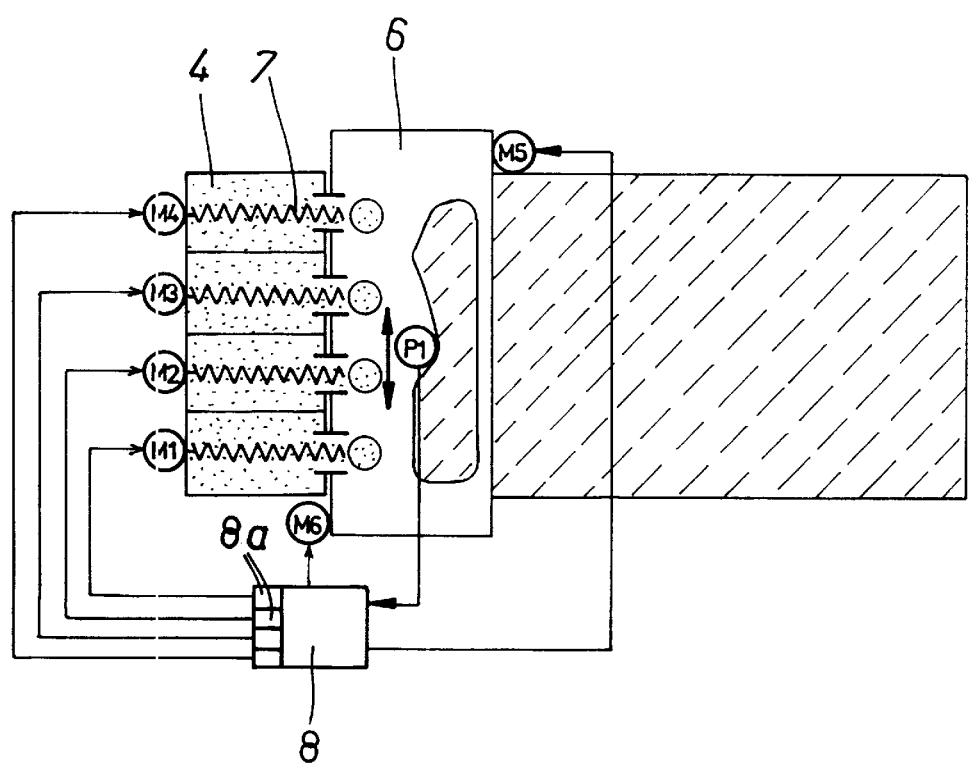

One exemplary embodiment of the invention will now be described in more detail with reference made to the accompanying drawing, in which FIG. 1 shows schematically in a side view an apparatus for implementing a method of the invention, and FIG. 2 shows the same apparatus schematically in a plan view.

The apparatus constitutes a mixer wagon, which is movable along a rail 1 and supported by carrier trolleys 2 (FIG. 1). Optionally, the mixer wagon can be movable on wheels along a floor. The apparatus as shown includes a coarse feed container 3 and four units of concentrated fodder containers 4 (FIG. 2). Subsequently, the term used for concentrated fodders is "flour". The coarse feed may comprise fresh feed, straw feed, pre-mixed feed composition, or the like, the dosage of which necessitates weighing on the scales. The coarse feed container 3 and the flour containers 4 are located on the opposite sides of a horizontal conveyor 6. The coarse feed is delivered from the container 3 by means of a conveyor 5, which is driven by a motor M5. The horizontal conveyor 6 is provided with a weighing sensor P1 for measuring the weight of the supplied amount of coarse feed, which is supplied to a control unit 8. When a desired weight of coarse feed has been dosed, the control unit 8 stops the conveyor 5.

The floor of each flour container 4 is provided with a metering screw 7, which are driven by motors M1–M4 controlled by calculators 8a (FIG. 2) of the data processing and control unit 8. The amounts of flour dosed from each container 4 are delivered on the basis of the turning time or number of turns of the metering screws 7. The metering mechanisms are connected to input a calibration dose from each container 4 onto the conveyor 6 by informing the control unit 8 of the turning time or number of turns corresponding to the weight of the calibration dose. Thus, after this calibration, the accurate weight-based dosage of components from the containers 4 is input to control unit 8 without requiring any weighing procedure.

While the conveyor 5 is in operation, i.e. concurrently with the weighing process of the amount of coarse feed supplied onto the conveyor 6, the metering screws 7 dose desired amounts of flour proportioned as desired to the amount of coarse feed directly within the coarse feed. The coarse feed weighing decreased in real time on the basis of flour dosages obtained from the calculator 8a. In other words, the coarse feed weighing is corrected by subtracting from the weighed amount of all components the amounts of concentrated flour as the latter dosages are arriving on the scales. This enables the expeditious preparation of an individual feed mixture for every animal. The data processing and control unit 8 is pre-set for amount appropriate for each animal. The motor M5 drives the horizontal conveyor 6, which unloads the metered fodders alongside the dosage and mixer wagon in front of the animal.

Hence, the flour metering screws 7 may all function concurrently, which speeds up the operation of the apparatus. The term "flour" used in the above specification refers to all types of concentrated fodders, thus, not only to actual flour but also to various processed feeds and minerals and the like floured, granular, or flaked feeds to be dosed by means of spiral feeders.

What is claimed is:

1. A method for dosing weighed coarse feed with a plurality of dosing components to make a succession of mixed dosed fodders for successively feeding animals at successive feeding stations, said method comprising placing a plurality of precisely measured dosing compounds onto a conveyor for supplying individual animals with a mixed fodder comprising a variable amount of said weighed coarse feed and varied amounts of said dosing components, characterized in that a single weighed coarse feed component is weighed on said conveyor and that the added dosing components are metered by a data processing unit concurrently without weighing onto said conveyor at individual feeding stations, said feeding dosage being controlled by said data processing unit connected to control individual metering feeding mechanisms for said individual feeding stations to mix said dosages of said unweighed dosing components with said weighed feed component, and further in that the indicated weighed amount of said weighed component is reduced during the introduction of said unweighed component by said data processing unit while the unweighed added dosing components continue to be added at said individual stations feeding, and wherein the aforesaid reduction is carried out on the basis of and in response to the supply rates of said calculated dosing component as controlled by said data processing unit.

2. A method as set forth in claim 1, characterized in that a program controlling the metering mechanisms for said dosing components is connected to and used for preparing an individual feed composition for each individual animal.

3. A method as set forth in claim 1 or 2, characterized in that said metering mechanism comprises a metering screw and conveyors, and wherein the amounts of said dosing components metered thereby are determined on the basis of the turning time or number of turns of said metering screws.

4. A method as set forth in claim 1 or 2, further wherein said metering mechanism is calibrated by delivering a calibration dose onto said conveyor and by the step of inputting said control unit with the turning time or number of turns corresponding to the weight of said calibration dose.

5. A method as set forth in claim 1, characterized in that the component to be weighed on said conveyor and the unweighed components to be dosed with said metering mechanisms are delivered onto said conveyor from the opposite sides thereof to a substantially common location.

6. An apparatus for dosing weighed coarse feed with a plurality of unweighed dosing components to make a mixed fodder for feeding a plurality of successive animals at a plurality of successive feeding stations, said apparatus comprising a coarse feed container, a plurality of concentrated dosing fodder containers, a main feed conveyor, a conveyor connected for supplying said weighed coarse feed onto said main feed conveyor, individual measuring conveyor connected to supply said concentrated dosing fodders onto said main conveyor, and a data processing unit connected to control said individual measuring conveyors, and connected to said successive individual feeding stations, said data processing unit being connected for receiving inputted weighing data from a weighing sensor in said main conveyor and also being programmed for controlling the operation of said coarse weighed feed supply means, characterized in that only a single component, specifically said coarse feed, is connected to be input by weighing, wherein said individual measuring conveyors for said concentrated dosing fodders are metering mechanisms controlled by said data processing unit which is connected for dosing amounts of concentrated dosing fodder proportioned to the amount of said weighed component concurrently with the weighing thereof, and wherein said data processing unit is connected to reduce the indicated weighing result of said weighed coarse feed component in response to the measured supply of amounts of unweighed concentrated dosage fodders as inputted by said data processing unit.

7. An apparatus as set forth in claim 6, characterized in that the supply means for coarse feed and the supply means for concentrated dosage fodders are located on the opposite sides of a conveyor and are controlled to supply substantially simultaneously the weighed and the non-weighed measured components to a substantially common location.

8. An apparatus as set forth in claim 6 or 7, characterized in that said supply means for concentrated dosage fodders includes metering screws, the turning time or number of turns thereof being inputted to said computer as a basis for determining the dosages of concentrated dosage fodders and the weights corresponding thereto, and connected to said apparatus for weighing said coarse feed, by the data processing unit to continually reduce the weighing result of said coarse weighed feed in response to the amount of dosage added, all in response to the output from said data processing unit.

* * * * *